United States Patent [19]

Chiba et al.

[11] Patent Number: 4,507,465

[45] Date of Patent: Mar. 26, 1985

[54] PROCESS FOR PRODUCING LACTAM/POLYOL BLOCK COPOLYMER

[75] Inventors: Kazumasa Chiba; Kazuhiko Kobayashi, both of Nagoya; Tosaku Susuki, Otsu, all of Japan

[73] Assignee: Toray Industries, Inc., Tokyo, Japan

[21] Appl. No.: 565,624

[22] Filed: Dec. 27, 1983

[30] Foreign Application Priority Data

Dec. 29, 1982 [JP] Japan ............................... 57-231985
Apr. 26, 1983 [JP] Japan ................................. 58-73465

[51] Int. Cl.³ ............................................. C08G 69/20
[52] U.S. Cl. ..................................... 528/312; 525/420; 528/313; 528/314; 528/315; 528/317; 528/323
[58] Field of Search ............... 528/323, 312, 313, 314, 528/315, 317; 525/420

[56] References Cited

U.S. PATENT DOCUMENTS 4,031,164 6/1977 Hedrick et al. ...................... 528/323

Primary Examiner—Harold D. Anderson
Attorney, Agent, or Firm—Austin R. Miller

[57] ABSTRACT

A block copolyamide having effectively improved impact strength is obtained by polymerizing a mixture comprising substantially from about 50 to about 95 parts by weight of lactam and from about 50 to about 5 parts by weight of polyol in the presence of catalyst for an anionic polymerization and activator represented by the following formula (I);

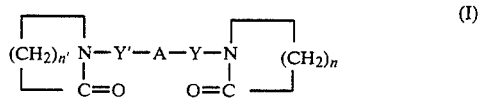

wherein A denotes a bifunctional organic residue having at least one kind of heteroatoms selected from the group consisting of N, O, S, F, Cl, Br and I, and Y and Y' denote an acyl group selected from the group consisting of

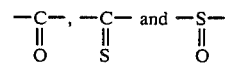

respectively, and n and n' denote an integer of 3 to 11 respectively, or by polymerizing, in the presence of catalyst for anionic polymerization, a mixture comprising substantially from about 50 to about 95 parts by weight of lactam and from about 5 to about 50 parts by weight of prepolymer obtained by a reaction of polyol and activator represented by the above formula (I), wherein A denotes a bifunctional aromatic residue having at least one halogen atom attached to the aromatic ring, and Y, Y', n and n' denote the same.

21 Claims, No Drawings

PROCESS FOR PRODUCING LACTAM/POLYOL BLOCK COPOLYMER

BACKGROUND OF THE INVENTION (a) Field of the Invention

The present invention relates to a process for producing a block copolyamide having effectively improved impact strength by anionic polymerization.

(b) Description of the Prior Art

It is well known that lactams can be anionically polymerized in the presence of an anionic polymerization catalyst and certain activators. Many kinds of molded polyamide articles are obtained by anionic polymerization procedures. In general, these anionically polymerized polyamide articles possess high mechanical strength, good abrasion resistance and good fatigue resistance due to high degrees of crystallinity. However, the impact strength of these articles is fairly low and this disadvantage causes the application of anionic polymerization to be restricted.

In order to improve impact strength, it is proposed to employ processes for producing a block copolyamide from lactams and polyols such as polyalkylene glycols, polylactonediols and polyolefin polyols by anionic polymerization.

One of the important advantages of anionic polymerization is that final products can be directly obtained by polymerizing raw materials such as lactam and polyol in a mold. Therefore a high polymerization rate is demanded for the effective production of molded products. In general the polymerization rate in the anionic polymerization of lactam is mainly governed by the structure of the employed activators. There have been presented no activators which enable completion of polymerization of a mixture of lactam and polyol in a short time and also produce molded articles having good surface appearance and mechanical properties. It haas been long desired to create activators which satisfy all of the above-described requirements.

For example, when isocyanate compounds were employed as activators (U.S. Pat. No. 3,704,280), it took a very long time to complete the polymerization reaction because of low activity of the activators. As another example, when polyacyllactams such as adipyl biscaprolactam, terephthaloyl-biscaprolactam or isophthaloyl-bis-caprolactam were used (U.S. Pat. No. 3,862,262), molded products could not be demolded easily and, therefore, had poor surface appearance. Surface appearance can be improved to some extent by increasing the amount of activators, but then, decrease in molecular weight and impact strength of the produced polymer occur simultaneously.

BRIEF SUMMARY OF THE INVENTION

An important object of the present invention is to provide a process for producing block copolyamide moldings having good surface appearance and good impact strength rapidly and effectively by anionic polymerization.

The foregoing object of the invention can be achieved by polymerizing a mixture comprising substantially from about 50 to about 95 parts by weight of lactam and from about 50 to about 5 parts by weight of polyol in the presence of a catalyst for an anionic polymerization and an activator represented by the following formula (I);

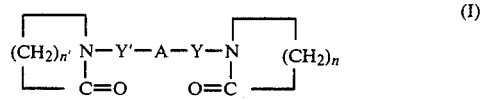

wherein A denotes a bifunctional organic residue having at least one kind of heteroatom selected from the group consisting of N, O, S, F, Cl, Br and I, and Y and Y' denote an acyl group selected from the group consisting of

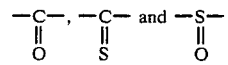

and n and n' denote an integer from 3 to 11, or by polymerizing, in the presence of a catalyst for anionic polymerization, a mixture comprising substantially from about 50 to about 95 parts by weight of lactam and from about 5 to about 50 parts by weight of prepolymer obtained by a reaction of a polyol and an activator represented by the following general formula (IX);

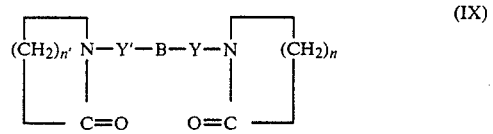

wherein B denotes a bifunctional aromatic residue having at least one halogen atom attached to the aromatic ring and Y and Y' denote an acyl group selected from the group consisting of

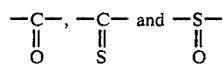

and n and n' denote an integer from 3 to 11.

DETAILED DESCRIPTION OF THE INVENTION

Generally, in anionic polymerization of a mixture of lactam and polyol, the rate of polymerization and moldability are influenced by reactivity and the amount of activators. The polymerization is accomplished in a short time by use of activators having high reactivity. The more activator that is used, the more the polymerization rate is enhanced and the mold-release property and surface appearance of molded articles become excellent.

Activators employed in the present invention are represented by the above described general formula (I). Activators of the present invention are characterized by at least bifunctional compounds wherein two lactams are combined with a bifunctional organic residue A having specific heteroatoms through acyl groups represented by Y and Y'. Y and Y' are selected from

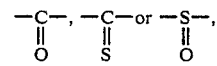

preferably

The role of heteroatoms introduced into the residue A is important. The heteroatom can elevate solubility of activators in a mixture of lactam and polyol, and enhance reactivity of activators in anionic polymerization. As a result, it can be effectively achieved by use of activators having specific heteroatoms in the residue A that molded articles having excellent surface appearance and mechanical properties can be obtained very rapidly in anionic polymerization of a mixture of lactam and polyol.

Preferably, activators wherein A in said formula (I) comprises at least one bifunctional organic residue which is selected from the group represented by the following general formula (II), (III), (IV), (V), (VI), (VII) and (VIII) are employed.

$$-B- \qquad (II)$$
$$-Z-R^1-Z'- \qquad (III)$$
$$-R^1-Z-R^2- \qquad (IV)$$
$$-R^2-Z-R^3-Z'-R^4- \qquad (V)$$

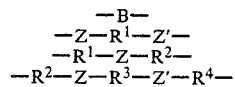

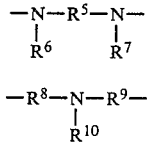

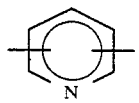

wherein B in formula (II) denotes a bifunctional aromatic residue having at least one halogen atom attached to the aromatic ring and Z and Z' in formula (III), (IV) and (V) denotes an oxygen atom or a sulfur atom, respectively, and $R^1$, $R^2$, $R^3$ and $R^4$ denote bifunctional organic groups having 1 to 10 carbon atoms respectively, and $R^5$, $R^8$ and $R^9$ in formula (VI) and (VII) denote bifunctional organic groups having 1 to 20 carbon atoms respectively, and $R^6$, $R^7$ and $R^{10}$ denote a hydrogen atom or a monofunctional organic group having 1 to 15 carbon atoms.

The compounds wherein the residue A is represented by the above-described formula (II) are hereinafter referred to as activator (II). Representative examples of the group B in formula (II) include monochlorophenylenes such as 2-chloro-1,3-phenylene, 2-chloro-1,4-phenylene; dichlorophenylenes such as 2,5-dichloro-1,3-phenylene, 4,6-dichloro-1,3-phenylene, 2,3-dichloro-1,4-phenylene, 2,5-dichloro-1,4-phenylene, 2,6-dichloro-1,4-phenylene; trichlorophenylenes such as 2,3,5-trichloro-1,4-phenylene; tetrachlorophenylenes such as 2,3,5,6-tetrachloro-1,4-phenylene; monobromophenylenes such as 2-bromo-1,3-phenylene, 5-bromo-1,3-phenylene, 2-bromo-1,4-phenylene; dibromophenylenes such as 2,5-dibromo-1,3-phenylene, 2,5-dibromo-1,4-phenylene; tetrabromophenylenes such as 2,3,5,6-tetrabromo-1,4-phenylene; monofluorophenylenes such as 2-fluoro-1,3-phenylene, 2-fluoro-1,4-phenylene; difluorophenylenes such as 2,5-difluoro-1,3-phenylene, 2,5-difluoro-1,4-phenylene; monoiodophenylenes such as 2-iodo-1,3-phenylene, 2-iodo-1,4-phenylene; diiodophenylenes such as 2,5-diiodo-1,3-phenylene, 2,5-diiodo-1,4-phenylene; monochloronaphthylenes such as 1-chloro-2,6-naphthylene, 1-chloro-2,5-naphthylene; dichloronaphthylenes such as 1,5-dichloro-2,6-naphthylene; tetrachloronaphthylenes such as 1,4,5,8-tetrachloro-2,6-naphthylene; monobromonaphthylenes such as 1-bromo-2,6-naphthylene; monochlorobiphenylenes such as 2-chloro-4,4'-biphenylene, 4-chloro-2,2'-biphenylene;

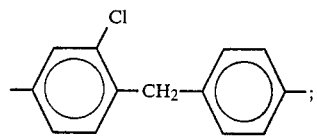

dichlorobiphenylenes such as 2,2'-dichloro-4,4'-bisphenylene;

tetrachlorobiphenylenes such as 2,2'6,6'-tetrachloro-4,4'-biphenylene; monobromobiphenylenes such as 2-bromo-4,4'-biphenylene;

Preferably, monochlorophenylenes, dichlorophenylenes, tetrachlorophenylenes, and monobromophenylenes are employed. Most preferably, 2-chloro-1,4-phenylene and 2,5-dichloro-1,4-phenylene are employed. Activators (II) having at least one halogen atom attached to the aromatic ring of the residue A, have favorable characteristic features compared with known activators in which the residue A comprises a hydrocarbon. That is, activators (II) can bring about high polymerizability because of the electronwithdrawing effect of the halogen atom positioned near the acyl groups represented by Y and Y' and good solubility in a mixture of lactam and polyol owing to the high polarity of the halogen atom. Thus molded articles having excellent surface appearance can be obtained by use of activators (II).

Activators (II) of the present invention are generally synthesized by addition of lactams such as α-pyrrolidone, ε-caprolactam and ●-lauryllactam to acid halides of dicarboxylic acid having at least one halogen atom attached to the aromatic ring.

Acid halides are represented by the following formula;

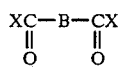

wherein B denotes the same aromatic residue in said formula (II) and X denotes halogen atom. Representative examples of the said acid halides include 2-chloroisophthaloyldichloride, 2,5-dichloroisophthaloyldichloride, 4,6-dichloroisophthaloyldichloride, 2-bromoisophthaloyldichloride, 5-bromoisophthaloyldichloride, 2,5-dibromoisophthaloyldichloride, 2-bromoisophthaloyldibromide, 5-bromoisophthaloyldibromide, 2-chloroterephthaloyldichloride, 2,3-dichloroterephthaloyldichloride, 2,5-dichloroterephthaloyldichloride, 2,6-dichloroterephthaloyldichloride, 2,3,5,6-tetrachloroterephthaloyldichloride, 2-bromoterephthaloyldichloride, 2,5-dibromoterephthaloyldichloride, 2-chloroterephthaloyldibromide, 1-chloronaphthalene-2,6-dicarboxylic acid dichloride, 1,5-dichloronaphthalene-2,6-dicarboxylic acid dichloride, 1-bromonaphthalene-2,6-dicarboxylic acid dichloride, 1-chloronaphthalene-2,5-dicarboxylic acid dichloride, 2-chlorobiphenyl-4,4'-dicarboxylic acid dichloride, 2,2'-dichlorobiphenyl-4,4'-dicarboxylic acid dichloride, 4-chlorobiphenyl-2,2'-dicarboxylic acid dichloride, 2-bromobiphenyl-4,4'-dicarboxylic acid dichloride, 2-chlorodiphenylmethane-4,4'-dicarboxylic acid dichloride, 2,2'-dichlorodiphenylmethane-4,4'-dicarboxylic acid dichloride, 1,2-bis(2-chlorophenoxy)ethane-4,4'-dicarboxylic acid dichloride, 1,2-bis(3-chlorophenoxy)ethane-4,4'-dicarboxylic acid dichloride, 1,2-bis(2,6-dichlorophenoxy)ethane-4,4'-dicarboxylic acid dichloride, 1,2-bis(2-bromophenoxy)ethane-4,4'-dicarboxylic acid dichloride.

In the present invention, it is also possible to form a prepolymer represented by the following formula (X) by reaction of activator (II) and polyol. The block copolyamide is obtained by subsequently polymerizing a mixture of prepolymer and lactam in the presence of catalyst for anionic polymerization.

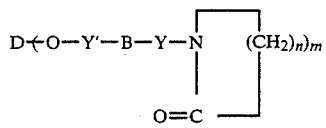
(X)

wherein D denotes the polyol residue and B denotes the bifunctional aromatic residue having at least one halogen atom attached to the aromatic ring and Y and Y' denote an acyl group selected from the group consisting of

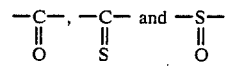

and n denotes an integer from 3 to 11.

Prepolymers can also be synthesized by preliminary reaction of diacid halide and polyol and addition of lactam.

A mixture of prepolymer thus obtained and a lactam is polymerized in the presence of catalyst for anionic polymerization.

The rate of anionic polymerization of prepolymer and lactam can also be enhanced by at least one halogen atom attached to the aromatic ring in the residue B.

The compounds wherein the residue A is represented by the above-described formulas (III), (IV) and (V) are hereinafter referred to as activators (III), (IV) and (V) respectively. Each Z and Z' denote oxygen or sulfur, preferably oxygen and $R^1$, $R^2$, $R^3$ and $R^4$ may be selected from the group consisting of methylene, ethylene, propylene, butylene, pentylene, hexylene, 2,2-dimethylpropylene, dimethylhexylene, decamethylene, dodecamethylene, methylpentylene, phenylene, monochlorophenylene, dichlorophenylene, naphthylene, and anthracylene, and $R^1$, $R^2$, $R^3$ and $R^4$ are preferably selected from the group consisting of methylene, ethylene, propylene, butylene, 2,2-dimethylpropylene, phenylene, monochlorophenylene and dichlorophenylene.

The compounds wherein the residue A is represented by the above-described formula (VI) are hereinafter referred to as activator (VI).

$R^5$ may be selected from the group consisting of tetramethylene, hexamethylene, undecamethylene, dodecamethylene, 2-methylbutylene, butenylene, 1,3-dimethylphenylene, dicyclohexylenemethylene, 1,2-dimethylcyclohexylene, 1,4-dimethylcyclohexylene, 1,4-diethylphenylene, 1,4-dimethylnaphthylene, 1,5-dimethylnaphthylene, n-propyl-biphenylene, 1,3-phenylene, 1,4-phenylene, 2,4-tolylene, 2,5-tolylene, 2,6-tolylene, 3,5-tolylene, 1,3-dimethyl-2,4-phenylene, 1,3-dimethyl-4,6-phenylene, 1,4-dimethyl-2,5-phenylene, 1,4-naphthylene, 1,5-naphthylene, 2,6-naphthylene, 2,7-naphthylene,

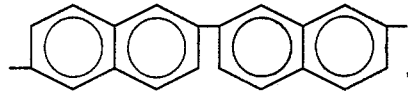

4,4'-biphenylene, 2,2'-dimethylbiphenylenemethylene, 4,4'-diphenylenemethylene, 2,2'-dimethyl-4,4'-diphenylenemethylene, 4,4'-dicyclohexylenemethylene and 3,3'-dimethoxy-4,4'-diphenylenemethylene. $R^5$ is preferably selected from the group consisting of hexamethylene, dicyclohexylenemethylene, tolylene, phenylene and diphenylenemethylene. $R^6$ and $R^7$ may be selected from the group consisting of hydrogen atom, methyl, ethyl, propyl, cyclohexyl, p-xylyl, and phenyl. $R^6$ and $R^7$ are preferably selected from the group consisting of hydrogen atom and methyl, more preferably hydrogen atom.

The compounds wherein the residue A is represented by the above-described formula (VII) are hereinafter referred to as activator (VII). $R^8$ and $R^9$ are preferably selected from the group consisting of ethylene, propylene and hexamethylene and $R^{10}$ is preferably selected from the group consisting of hydrogen atom and methyl.

Activators (III) of the present invention are generally synthesized by reaction of phosgene, thiophosgene or sulfonyldichloride a with compound which has an —OH group or an —SH group and whose molecular weight is below 300, represented by HO—$R^1$—OH, HS—$R^1$—SH or HO—$R^1$—SH, preferably HO—$R^1$—OH, and successive addition of lactam to the resultant product.

Activators (IV) and (V) of the present invention are generally synthesized by reaction of lactams such as α-pyrrolidone, ε-caprolactam, ω-lauryllactam and dicarboxylic acid dihalides having an oxygen atom or a sulfur atom represented by Z and Z'. Representative examples of the said dicarboxylic acid dihalides include diglycolic acid dichloride, thiodiglycolic acid dichloride, diphenylether-4,4'-dicarboxylic acid dichloride, diphenylthioether-4,4'-dicarboxylic acid dichloride, 1,2-diphenoxyethane-4,4'-dicarboxylic acid dichloride.

Activators (VI) of the present invention are generally synthesized by (a) reaction of a lactam and a compound having an isocyanate group or an isothiocyanate group represented by OCN—$R^5$—NCO, SCN—$R^5$—NCO, SCN—$R^5$—NCS or (b) reaction of phosgene, thiophosgene, or sulfonyldichloride with a compound having a secondary amino group and successive addition of lactam to the resultant product.

Representative examples of said compound having a secondary amino group include N,N'-dimethyl-1,4-tetramethylenediamine, N,N'-dimethyl-1,6-hexamethylenediamine, N,N'-diethyl-1,6-hexamethylenediamine, N-methyl-N'-propyl-1,6-hexamethylenediamine, N,N'-dimethyl-1,4-cyclohexylenediamine, N,N'-dimethyl-m-xylylenediamine, N,N'-dicyclohexyl-p-xylylenediamine and N,N'-diphenyl-p-phenylenediamine.

Activators (VII) of the present invention are generally synthesized by reaction of a lactam and a dicarboxylic acid dihalide having an amino group represented by

Activators (VIII) of the present invention are generally synthesized by reaction of a lactam and pyridine-2,6-dicarboxylic acid dihalide.

The above-described activators can be employed in the form of a mixture or alone in the amount of about 0.0005–0.6 times, preferably about 0.001–0.25 times by mole, based on lactam.

Lactams of the present invention are cyclic amide compounds having 4 to 12 carbon atoms. Representative examples of lactams include α-pyrrolidone, valerolactam, caprolactam, enantholactam, capryllactam and lauryllactam. Preferably ε-caprolactam is employed.

Polyols of the present invention have at least two hydroxyl groups and a molecular weight of about 200 to 10,000, preferably about 300–5,000. Representative examples of polyol include polyethylene glycol, polypropylene glycol, poly(oxyethylene/oxypropylene) diol, polyoxyethylene triol, polyoxypropylene triol, poly(oxyethylene/oxypropylene)triol, polytetramethylene glycol, polyoxybutylene triol, polyetherpolyols obtained by addition of ethyleneoxide and/or propyleneoxide to glycerine, trimethylolpropane, pentaerythritol and so on, polyesterpolyols such as poly-ε-caprolactonediol, polybutadienediol and poly(butadiene/styrene)-copolymer diol. Preferably polyethylene glycol, polypropylene glycol, polytetramethylene glycol, poly(oxyethylene/oxypropylene)glycol, polyoxyethylene triol, polyoxypropylene triol, poly(oxyethylene/oxypropylene)triol, polyoxybutylene triol and more preferably polypropylene glycol, poly(oxyethylene/oxypropylene)glycol, polyoxypropylene triol, poly(oxyethylene/oxypropylene)triol are employed. Polyols can be employed in one kind or more than two kinds in the amount of about 0.05–0.5 times by weight based on lactam. Where the amount of polyols is less than 0.05 times by weight, the toughness of the blockcopolyamide obtained is insufficient. On the other hand, where the amount of polyols is greater than 0.5 times by weight based on lactam, rigidity and heat resistance of blockcopolyamide deteriorate remarkably.

Catalysts for anionic polymerization of the present invention are not limited and well known compounds can be employed. Representative examples of catalysts include salts of alkali metal and alkaline earth metals and lactams such as sodium lactamate, potassium lactamate and calcium lactamate and basic compounds which are able to form a lactamate anion by reaction of lactam in situ such as alkali metals, alkaline earth metals, their hydrides, hydroxides, oxides, carbonates, alkoxides, alkyl compounds and aryl compounds, trialkylaluminium compounds and Grignard reagents. Catalyst can be employed in one kind or more than two kinds in the amount of about 0.001–0.1 times, preferably 0.003–0.05 times by mole based on lactam.

Polymerization of a block copolyamide of the present invention can be carried out using equipment conventionally employed for anionic polymerization of lactams under usual processing conditions. For example, a so-called one-component method or two-component method can be used. In the former case, lactam, polyol, catalyst and activator are mixed in a molten state in one reactor and then the resultant mixture is poured into molds to undergo subsequent polymerization therein. In the latter case, lactam is melted in two separate containers, one portion being mixed with catalysts and the other with activators. Polyols are added into one of the two lactam solutions and it is not important whether polyols are introduced into catalyst-side or activator-side. Then exactly measured quantities of the two components are fed to a mixing head and the mixture is poured into molds in which polymerization takes place. Polymerization can be carried out in the temperature range between the melting point of the lactam monomer and the melting point of the resultant polymer, preferably in the range of 100°–200° C. Conventional molding methods such as rotational casting or centrifugal casting can also be applied.

The block copolyamide of the present invention may optionally contain inorganic or organic fibrous reinforcing agents such as glass fibers, carbon fibers, asbestos fibers or fibers consisting of wholly aromatic polymers. Polyamides and polyesters whose melting temperatures are higher than anionic polymerization temperature can also be contained as reinforcing agents. The block copolyamide of the present invention may also optionally contain powdery or beaded fillers such as talc, wollastonite, calcium carbonate, magnesium oxide, aluminium oxide, mica, glass beads, and potassium titanate whiskers.

Fibrous reinforcing agents can be used in any normally available form, milled, chopped, roved and so on.

Other additives may be contained in the block copolyamide of the present invention without preventing the polymerizability and moldability. Representative examples of additives include pigments, dyes, flame retarding agents, heat stabilizers, antioxidants, light stabilizers, lubricants, mold-releasing agents, antistatic agents, plasticizers, nucleating agents, forming agents and other polymer material. Molded articles obtained by molding the block copolyamide of the present invention are useful for a variety of parts, especially for machinery parts and automobile parts.

The present invention will be more clearly understood with reference to the following examples. Properties of polyamides described in examples were measured by the following methods.

(1) Tensile properties: ASTM D638
(2) Flexural properties: ASTM D790
(3) Izod impact sftrength: ASTM D256
(4) Heat distortion temperature: ASTM D648
(5) Surface appearance: Observation with the naked eye.

EXAMPLE 1

(Preparation of activator)

300 g of anhydrous ε-caprolactam and 77 g of pyridine as acid capturing agent were mixed at 50°–60° C. in a flask equipped with a stirrer and nitrogen inlet. 110 g of ethylene-1,2-diphenoxy-p-dicarbonyl chloride was added to the mixture gradually under stirring in the stream of nitrogen. The solution was heated at 130° C. for 1 hr and then the reaction mixture was poured into 10 liters of cold water under vigorous stirring to give white precipitates. The precipitates were washed three times with water and dried in vacuo yielding a white powder (m.p. 202°–203° C.). The product was determined as ethylene-1,2-diphenoxy-p-dicarbonyl-bis-caprolactam by IR (1700, 1680 cm$^{-1}$, $\nu$

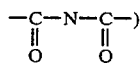

and elemental analysis (Calcd. C: 68.3%, H: 6.5%, N: 5.7%, found C: 68.1%, H: 6.4%, N: 5.9%).

(Anionic polymerization)

80 g of anhydrous ε-caprolactam and 14.2 m mol of ethylmagnesium bromide (ether solution) were mixed in a nitrogen atmosphere at 90°–100° C. Then ether was distilled off under a slight vacuum to give a clear solution.

To this ε-caprolactam solution, 20 g of polypropylene glycol (number average molecular weight $\overline{Mn}$: 2,000) and 7.0 g of ethylene-1,2-diphenoxy-p-dicarbonyl-bis-caprolactam were added, mixed well in a nitrogen atmosphere at 90°–100° C. and the resultant mixture was quickly poured into a metal mold which was kept at 160° C.

After about 5 minutes, the mold was opened. Anionic polymerization of ε-caprolactam and polypropylene glycol was completed within about 5 minutes to give a block copolyamide and the molded test-pieces designated by ASTM were taken from the mold. Mechanical properties and characteristics of these test-pieces are measured and the results were summarized in Table 1.

EXAMPLE 2

(Preparation of activator)

300 g of anhydrous ε-caprolactam and 77 g of pyridine as an acid capturing agent were mixed at 50°–60° C. in a flask equipped with a stirrer and nitrogen inlet. 88 g of 2,5-dichloroterephthaloyl chloride was added to the mixture gradually under stirring in a stream of nitrogen. The solution was heated at 130° C. for 1 hr and then the reaction mixture was poured into 10 liters of cold water under vigorous stirring to give white precipitates. The precipitates were washed three times with water and dried in vacuo to yield a white powder whose melting point was 187° C. The product was determined as 2,5-dichloroterephthaloylbis-caprolactam by IR (1710 and 1690 cm$^{-1}$, $\nu$

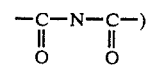

and elemental analysis (calcd. C: 56.5%, H: 5.2%, N: 6.6%, Cl: 16.7%, found C: 56.7%, H: 5.1%, N: 6.8%, Cl: 17.0%).

(Anionic polymerization)

50 g of anhydrous ε-caprolactam and 14.2 m mol of ethylmegnesium bromide (ether solution) were mixed in a nitrogen atmosphere at 90°–100° C. and then ether was distilled off under a slight vacuum to give a solution (A component solution).

30 g of anhydrous ε-caprolactam, 20 g of polypropylene glycol (number average molecular weight $\overline{Mn}$: 2,000) and 7.5 g of 2,5-dichloroterephthaloylbiscaprolactam were mixed in a nitrogen atmosphere at 90° C. for about 20 minutes to give a clear solution (B component solution).

A and B component solutions were mixed well and the mixture was quickly poured into a metal mold which was kept at 140° C. After about 5 minutes, the mold was opened. Anionic polymerization of ε-caprolactam and polypropylene glycol was completed within about 5 minutes to give a block copolyamide and the molded test-pieces designated by ASTM were taken from the mold. Mechanical properties and characteristics of these test-pieces were measured and the results are summarized in Table 1. This block copolyamide proved to give molded articles having excellent surface appearance and excellent mechanical properties.

Comparative Example 1

The same procedure as Example 2 was repeated except that terephthaloyl-biscaprolactam instead of 2,5-dichloroterephthaloyl-biscaprolactam as activator was employed. A mixture of A component solution consisting of ε-caprolactam and catalyst and B component solution consisting of ε-caproalctam, polypropylene glycol and activator was poured into a mold which was kept at 140° C. After about 5 minutes, the mold was opened. However anionic polymerization was not completed yet and the surface appearance of the molded articles were not sufficiently excellent for practical use.

EXAMPLE 3

(Preparation of prepolymer)

A reaction of 1 mol of polypropylene glycol ($\overline{Mn}$: 2,000) and 2 mol of 2,5-dichloroterephthaloylbiscaprolactam as activator was carried out in the presence of 0.05 mol of sodium ethylate at 120°–140° C. to yield a slightly brown-colored product. This product proved to be a prepolymer having a structure represented by the following formula by IR and $^{13}$C-NMR spectra.

Assignments of peaks in each spectra are as follows.

IR: no signals in 3,300–3,500 cm$^{-1}$ region ($\nu_{OH}$), 1730 cm$^{-1}$: $\nu_{C=O}$ of ester group, 1670 cm$^{-1}$: $\nu_{C=O}$ of imino group.

$^{13}$C-NMR: chemical shifts are presented in ppm referred to tetramethylsilane

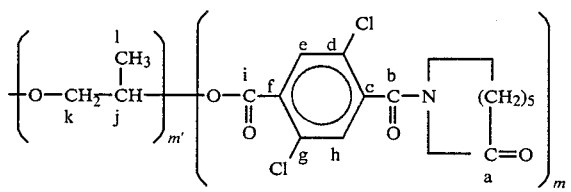

a: 177.0, b: 173.0, c: 133.6, d: 131.4, e: 131.0, f: 142.7, g: 145.3, h: 128.8, i: 166.1, j: 75.1–75.3, k: 72.9–73.3, l: 17.3

(Anionic polymerization)

50 g of anhydrous ε-caprolactam and 14.2 m mol of ethylmagnesium bromide (ether solution) were mixed in a nitrogen atmosphere at 90°–100° C. and then ether was distilled off under a slight vacuum to give a solution (A component solution).

30 g of anhydrous ε-caprolactam and 20 g of prepolymer were mixed in a nitrogen atmosphere at 90° C. to give a solution (B' component solution).

A mixture of A and B' component solution was quickly poured into a metal mold which was kept at 150° C. After about 5 minutes, the mold was opened and the molded test-pieces were taken from the mold. Mechanical properties of these test-pieces were measured and the results are summarized in Table 1.

EXAMPLE 4–17

By the method described in Example 1–3, but varying the kind and amount of lactam, polyol, catalyst and activator, block copolyamides were prepared and test-pieces were molded. The characteristics of the molded test-pieces are summarized in Table 1. In each case, the test-pieces showed excellent mechanical properties.

EXAMPLE 18

30% by weight of milled glass fibers (diameter: 10μ and length: 150μ) were added to A and B component solutions employed in Example 2. Then a mixture of A and B component solutions containing milled glass fibers was poured into a mold which was kept at 160° C.

After about 4 minutes, the mold was opened and the molded test-pieces were taken from the mold. Mechanical properties of these test-pieces were measured and the following results were obtained.

Tensile strength: 730 kg/cm$^2$
Flexural strength: 930 kg/cm$^2$
Flexural modulus: 32,500 kg/cm$^2$
Izod impact strength: 14 kg.cm/cm notch
Heat distortion temperature: 210° C. (4.64 kg/cm$^2$ load).

TABLE 1

|  | Example 1 | Example 2 | Example 3 | Example 4 | Example 5 |
|---|---|---|---|---|---|
| Lactam[1] | CL | CL | CL | CL | CL |
| Polyol[2] | PPG 2,000 | PPG 2,000 | PPG 2,000 | PPT 4,000 | PPG 3,000 |
| Composition of copolyamide (wt %) | N-6/PPG:80/20 | N-6/PPG:80/20 | N-6/PPG:80/20 | N-6/PPT:70/30 | N-6/PPG:75/25 |
| Catalyst (mol/mol lactam) | EtMgBr 0.020 | EtMgBr 0.020 | EtMgBr 0.020 | EtMgBr 0.010 | Na 0.010 |
| Activator[3] (mol/mol lactam) | [I] 0.020 | [II] 0.025 | [II] 0.025 | [II] 0.012 | [III] 0.022 |
| Polymerization temperature (°C.) | 160 | 140 | 150 | 150 | 140 |
| Polymerization time (min) | 5 | 5 | 5 | 7 | 8 |
| Tensile strength at yield (kg/cm$^2$) | 430 | 430 | 420 | 400 | 420 |
| Elongation at break (%) | 200 | 180 | 180 | 150 | 110 |
| Flexural modulus (kg/cm$^2$) | 13,900 | 13,800 | 13,800 | 11,800 | 12,400 |
| Izod impact strength (kg · cm/cm notch) | 30 | 32 | 31 | 45 | 37 |
| Heat distortion temperature (°C.) (4.64 kg/cm$^2$ load) | 175 | 180 | 180 | 170 | 173 |
| Surface appearance of molded article | Excellent | Excellent | Excellent | Excellent | Excellent |

|  | Example 6 | Example 7 | Example 8 | Example 9 | Example 10 |
|---|---|---|---|---|---|
| Lactam[1] | CL | CL/PY | CL | CL | CL |
| Polyol[2] | PTMG 650 | PPG 2,000 | PEG-PPG 2,000 | PTMG 1,000 | PPT 2,000 |
| Composition of copolyamide (wt %) | N-6/PTMG:70/30 | N-6/N-4/PPG: 45/15/40 | N-6/PEG-PPG: 75/25 | N-6/PTMG:80/20 | N-6/PPT:80/20 |
| Catalyst (mol/mol lactam) | EtMgBr 0.015 | EtMgBr 0.030 | EtMgBr 0.019 | EtMgBr 0.023 | EtMgBr 0.0 |
| Activator[3] (mol/mol lactam) | [IV] 0.019 | [IV] 0.020 | [IV] 0.015 | [V] 0.018 | [VI] 0.020 |
| Polymerization temperature (°C.) | 150 | 150 | 150 | 160 | 150 |
| Polymerization time (min) | 5 | 8.5 | 4.5 | 5 | 5.5 |
| Tensile strength at yield (kg/cm$^2$) | 410 | 380 | 420 | 420 | 420 |
| Elongation at break (%) | >200 | >200 | 160 | 180 | 200 |
| Flexural modulus (kg/cm$^2$) | 11,500 | 11,000 | 12,800 | 13,600 | 13,800 |
| Izod impact strength (kg · cm/cm notch) | 52 | 55 | 35 | 30 | 31 |
| Heat distortion temperature (°C.) (4.64 kg/cm$^2$ load) | 170 | 165 | 173 | 176 | 175 |
| Surface appearance of molded article | Excellent | Good | Excellent | Excellent | Excellent |

|  | Example 11 | Example 12 | Example 13 | Example 14 | Example 15 |
|---|---|---|---|---|---|
| Lactam[1] | CL | CL | CL | CL | CL |
| Polyol[2] | PTMG 650 | PPG 2,000 | PPG 3,000 | PTMG 1,300 | PTMG 1,300 |
| Composition of copolyamide (wt %) | N-6/PTMG:80/20 | N-6/PPG:75/25 | N-6/PPG:90/10 | N-6/PTMG:90/10 | N-6/PTMG:80/20 |
| Catalyst (mol/mol lactam) | K 0.010 | EtMgBr 0.020 | Na 0.015 | K 0.020 | EtMgBr 0.0 |

TABLE 1-continued

| Activator[3] (mol/mol lactam) | [VII] 0.031 | [VIII] 0.024 | [IX] 0.033 | [X] 0.029 | [XI] 0.032 |
|---|---|---|---|---|---|
| Polymerization temperature (°C.) | 150 | 140 | 170 | 150 | 150 |
| Polymerization time (min) | 8.5 | 18 | 11 | 21 | 6 |
| Tensile strength at yield (kg/cm$^2$) | 450 | 400 | 460 | 470 | 400 |
| Elongation at break (%) | 60 | 190 | 55 | 42 | 160 |
| Flexural modulus (kg/cm$^2$) | 14,100 | 13,200 | 16,000 | 17,200 | 14,000 |
| Izod impact strength (kg · cm/cm notch) | 23 | 28 | 12 | 10 | 32 |
| Heat distortion temperature (°C.) (4.64 kg/cm$^2$ load) | 180 | 173 | 183 | 185 | 170 |
| Surface appearance of molded article | Good | Excellent | Good | Good | Excellent |

|  | Example 16 | Example 17 |
|---|---|---|
| Lactam[1] | CL | CL |
| Polyol[2] | PEG 600 | PPG 2,000 |
| Composition of copolyamide (wt %) | N-6/PEG:90/10 | N-6/PPG:80/20 |
| Catalyst (mol/mol lactam) | EtMgBr 0.040 | Na 0.018 |
| Activator[3] (mol/mol lactam) | [XI] 0.082 | [XII] 0.033 |
| Polymerization temperature (°C.) | 150 | 160 |
| Polymerization time (min) | 7.5 | 7 |
| Tensile strength at yield (kg/cm$^2$) | 460 | 420 |
| Elongation at break (%) | 50 | 160 |
| Flexural modulus (kg/cm$^2$) | 16,200 | 14,300 |
| Izod impact strength (kg · cm/cm notch) | 12 | 28 |
| Heat distortion temperature (°C.) (4.64 kg/cm$^2$ load) | 184 | 172 |
| Surface appearance of molded article | Good | Good |

[1]CL: ε-caprolactam, PY: α-pyrrolidone
[2]PPG: polypropylene glycol, PPT: polyoxypropylene triol, PTMG: polytetramethylene glycol, PEG-PPG: poly (oxyethylene/oxypropylene) diol, PEG: polyethylene glycol Affix number represents number average molecular weight of polyols.

(3)

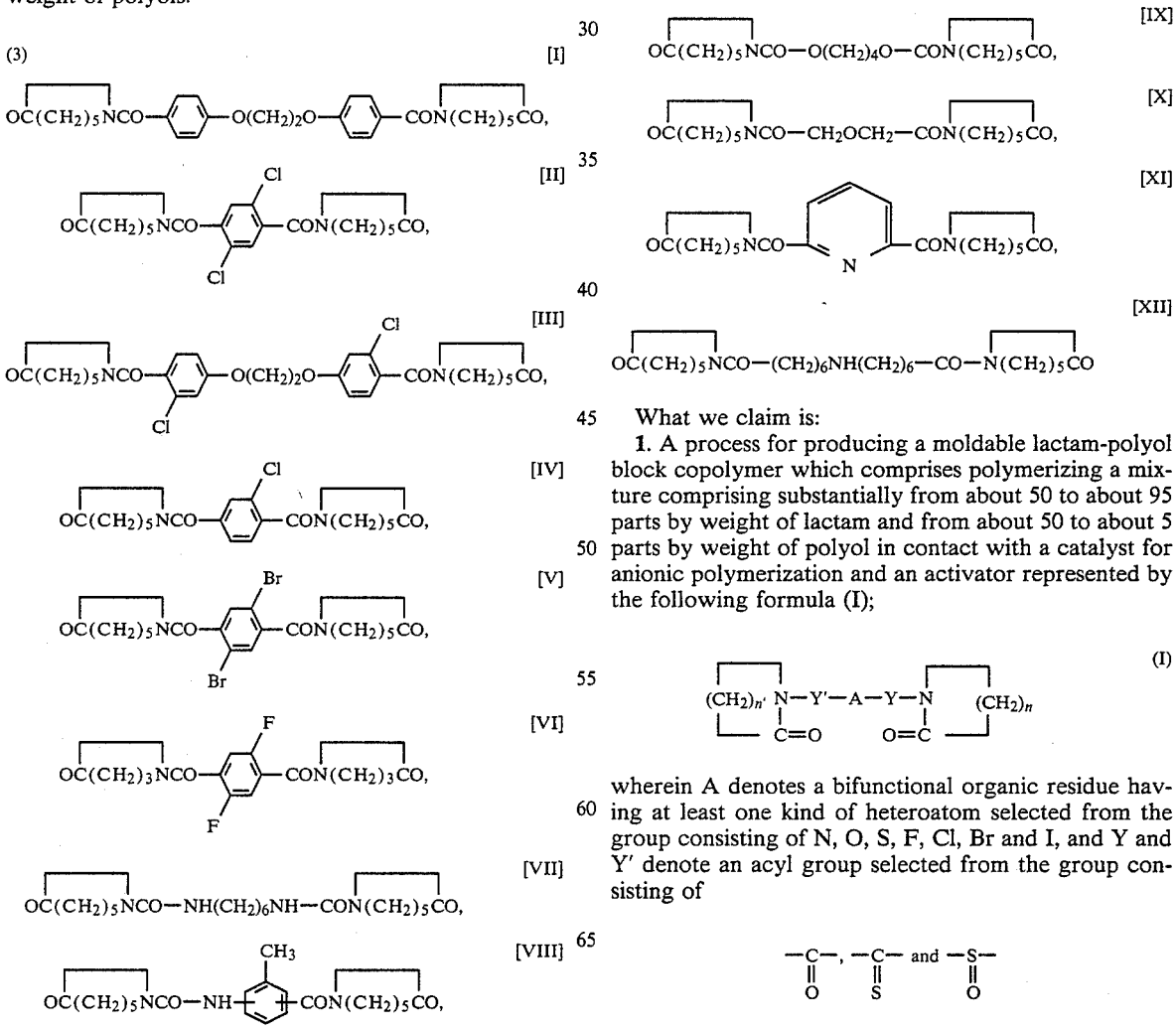

What we claim is:

1. A process for producing a moldable lactam-polyol block copolymer which comprises polymerizing a mixture comprising substantially from about 50 to about 95 parts by weight of lactam and from about 50 to about 5 parts by weight of polyol in contact with a catalyst for anionic polymerization and an activator represented by the following formula (I);

$$\text{(CH}_2)_{n'}\begin{array}{c}\overline{\phantom{XX}}\\ N-Y'-A-Y-N\\ |\phantom{XXXXXXX}|\\ C=O\phantom{XX}O=C\\ \underline{\phantom{XX}}\end{array}(\text{CH}_2)_n \quad \text{(I)}$$

wherein A denotes a bifunctional organic residue having at least one kind of heteroatom selected from the group consisting of N, O, S, F, Cl, Br and I, and Y and Y' denote an acyl group selected from the group consisting of

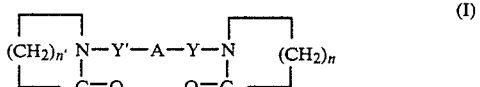

respectively, and n and n' denote an integer from 3 to 11.

2. The process according to claim 1 wherein A in said formula (I) comprises at least one of bifunctional organic residue which is selected from the group consisting of residues represented by the following general formulas (II), (III), (V), (VI), (VII) and (VIII) respectively;

$$-B- \quad (II)$$
$$-Z-R^1-Z'- \quad (III)$$
$$-R^1-Z-R^2- \quad (IV)$$
$$-R^2-Z-R^3-Z'-R^4- \quad (V)$$

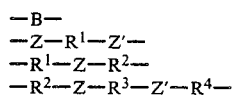  (VI)

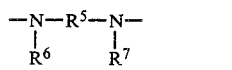  (VII)

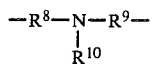  (VIII)

wherein B in formula (II) denotes a bifunctional aromatic residue having at least one halogen atom attached to the aromatic ring, and Z and Z' in formula (III), (IV) and (V) denote an atom selected from the group consisting of oxygen and sulfur respectively and $R^1$, $R^2$, $R^3$ and $R^4$ denote a bifunctional organic group having 1 to 10 carbon atoms, and $R^5$, $R^8$ and $R^9$ in formula (VI) and (VII) denote a bifunctional organic group having 1 to 20 carbon atoms and $R^6$, $R^7$ and $R^{10}$ denote a group selected from the group consisting of hydrogen atom and monofunctional organic group having 1 to 15 carbon atoms.

3. A process for producing a moldable lactam-polyol block copolymer which comprises polymerizing, in contact with a catalyst for anionic polymerization, a mixture comprising substantially from about 50 to about 95 parts by weight of lactam and from about 5 to about 50 parts by weight of prepolymer obtained by a reaction of polyol and activator represented by the following general formula (IX);

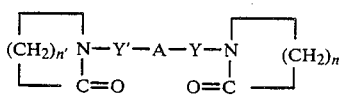  (I)

wherein B denotes a bifunctional aromatic residue having at least one halogen atom attached to the aromatic ring and Y and Y' denote an acyl group selected from the group consisting of

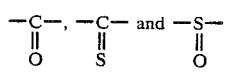

respectively, and n and n' denote an integer from 3 to 11 respectively.

4. The process according to claim 3, wherein said prepolymer is represented by the following formula (X);

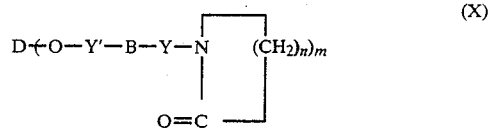

wherein D denotes polyol residue and m denotes an integer of 2 to 3, and B, Y, and n denote the same as in the formula (IX).

5. The process according to claim 1, 3 or 4, wherein Y and Y' denote

6. The process according to claim 2, wherein Z and Z' denote oxygen.

7. The process according to claim 2, 3 or 4, wherein B comprises a bifunctional group having at least one group selected from the group consisting of monochlorophenylene, dichlorophenylene, tetrachlorophenylene and monobromophenylene.

8. The process according to claim 2, 3 or 4, wherein B is selected from the group consisting of 2 chloro-1,4-phenylene and 2,5-dichloro-1,4-phenylene.

9. The process according to claim 2, wherein $R^1$, $R^2$, $R^3$ and $R^4$ are independently selected from the group consisting of methylene, ethylene, propylene, butylene, 2,2-dimethylpropylene, phenylene, monochlorophenylene and dichlorophenylene.

10. The process according to claim 2, wherein $R^5$ is selected from the group consisting of hexamethylene, dicyclohexylenemethylene, tolylene, phenylene and diphenylenemethylene.

11. The process according to claim 2, wherein $R^8$ and $R^9$ are independently selected from the group consisting of ethylene, propylene and hexamethylene.

12. The process of claim 2, wherein $R^6$, $R^7$ and $R^{10}$ are independently selected from the group consisting of hydrogen atom and methyl.

13. The process according to claim 1 or 3, wherein the amount of activator is 0.001–0.25 moles per mole of lactam polymerized.

14. The process according to claim 1 or 3, wherein the lactam is selected from the group consisting of pyrrolidone, valerolactam, caprolactam, enantholactam, capryllactam and lauryllactam.

15. The process according to claim 1 or 3, wherein the lactam is ε-caprolactam.

16. The process according to claim 1 or 3, wherein the number average molecular weight of the polyol is in the range of 300 to 5,000.

17. The process according to claim 1 or 3, wherein the polyol is selected from the group consisting of polyethylene glycol, polypropylene glycol, polytetramethylene glycol, poly(oxyethylene/oxypropylene)diol, polyoxyethylene triol, polyoxypropylene triol, poly(oxyethylene/oxypropylene)triol and polyoxybutylene triol.

18. The process according to claim 1 or 3, wherein the polyol is selected from the group consisting of polypropylene glycol, poly(oxyethylene/oxypropylene)diol, polyoxypropylene triol and poly(oxyethylene/oxypropylene)triol.

19. The process according to claim 1 or 3, wherein the catalyst for anionic polymerization is selected from the group consisting of alkali metal and alkaline earth metal and their lactamate salts, hydrides, alkoxides and alkylides, trialkylaluminium compounds and Grignard reagents.

20. The process according to claim 1 or 3, wherein the alkali metal is selected from the group consisting of sodium and potassium.

21. The process according to claim 1 or 3, wherein the amount of catalyst is 0.001–0.1 moles per mole of lactam polymerized.

* * * * *

UNITED STATES PATENT AND TRADEMARK OFFICE
CERTIFICATE OF CORRECTION

PATENT NO. : 4,507,465
DATED : 3/26/85
INVENTOR(S) : Kazumasa Chiba, Kazuhiko Kobayashi, Tosaku Susuki It is certified that error appears in the above-identified patent and that said Letters Patent is hereby corrected as shown below:

Column 1, line 40, "haas" should read --has--

Column 5, line 12, ".-lauryllactam" should read --ω lauryllactam--

Column 10, line 40-41, (B component solution) is set off as a subheading whereas it is actually the closing part of the sentence . . .to give a clear solution. . .

Signed and Sealed this

Twenty-ninth Day of October 1985

[SEAL]

Attest:

Attesting Officer

DONALD J. QUIGG

Commissioner of Patents and Trademarks—Designate

UNITED STATES PATENT AND TRADEMARK OFFICE
CERTIFICATE OF CORRECTION

PATENT NO. : 4,507,465
DATED : March 26, 1985
INVENTOR(S) : Kazumasa Chiba, Kazuhiko Kobayashi & Tosaku Susuki It is certified that error appears in the above-identified patent and that said Letters Patent is hereby corrected as shown below:

Column 13, line 65, Formula [VIII] should read:

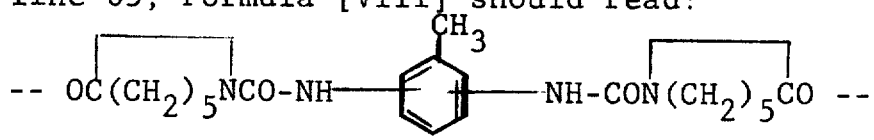

Signed and Sealed this

Second Day of September 1986

[SEAL]

Attest:

Attesting Officer

DONALD J. QUIGG

Commissioner of Patents and Trademarks